United States Patent
Abramson et al.

(10) Patent No.: US 6,378,062 B1
(45) Date of Patent: Apr. 23, 2002

(54) METHOD AND APPARATUS FOR PERFORMING A STORE OPERATION

(75) Inventors: Jeffery M. Abramson, Aloha; Haitham Akkary, Portland; Andrew F. Glew, Hillsboro; Glenn J. Hinton; Kris G. Konigsfeld, both of Portland; Paul D. Madland, Beaverton, all of OR (US)

(73) Assignee: Intel Corporation, Santa Clara, CA (US)

( * ) Notice: Subject to any disclaimer, the term of this patent is extended or adjusted under 35 U.S.C. 154(b) by 1188 days.

(21) Appl. No.: 08/825,427

(22) Filed: Mar. 28, 1997

Related U.S. Application Data

(63) Continuation of application No. 08/483,285, filed on Jun. 7, 1995, now abandoned, which is a continuation of application No. 08/177,250, filed on Jan. 4, 1994, now abandoned.

(51) Int. Cl.$^7$ .................................................. G06F 9/30
(52) U.S. Cl. ...................... 712/208; 712/200; 712/211; 712/216
(58) Field of Search .................... 375/376, 413, 375/425, 384, 387, 392, 575, 800; 712/208, 200, 211, 216

(56) References Cited

U.S. PATENT DOCUMENTS

| | | | | |
|---|---|---|---|---|
| 4,698,747 A | * | 10/1987 | Thompson et al. | 395/800 |
| 4,713,752 A | * | 12/1987 | Tone | 364/200 |
| 4,807,113 A | * | 2/1989 | Matsumoto et al. | 395/375 |
| 4,847,748 A | * | 7/1989 | Yamahata et al. | 364/200 |
| 4,897,787 A | * | 1/1990 | Kawasaki et al. | 395/375 |
| 4,924,377 A | * | 5/1990 | Kuriyama et al. | 364/200 |
| 5,101,346 A | * | 3/1992 | Ohtsuki | 395/800 |
| 5,313,644 A | * | 5/1994 | Matsuo et al. | 395/800 |
| 5,398,330 A | * | 3/1995 | Johnson | 395/575 |
| 5,428,761 A | * | 6/1995 | Herlihy et al. | 395/425 |
| 5,454,091 A | * | 9/1995 | Sites et al. | 395/413 |
| 5,475,855 A | * | 12/1995 | Uesugi | 395/800 |
| 5,481,683 A | * | 1/1996 | Karim | 395/375 |
| 5,487,156 A | * | 1/1996 | Popescu et al. | 395/375 |
| 5,491,829 A | * | 2/1996 | Kau et al. | 395/800 |
| 5,510,934 A | * | 4/1996 | Brennan et al. | 395/446 |
| 5,542,075 A | * | 7/1996 | Ebcioglu et al. | 395/700 |
| 5,659,782 A | * | 8/1997 | Senter et al. | 395/800.23 |

OTHER PUBLICATIONS

Hennessy et al., Computer Architecture A Quantitative Approach, 1990, pp. 200–203, 252–257, 260–265, 268, 269, 290–305, 432–437.*

Johnson, Mike; *Superscalar Microprocessor Design*; Prentice Hall, Inc., New Jersey, 1991.

Popescu, Val; Schultz, Merle; Spracklen, John; Gibson, Gary; Lightner, Bruce; Isaman, David, "The Metaflow Architecture", IEEE Micro, Jun. 1991, pp. Nos. 10–13 and 63–73.

* cited by examiner

*Primary Examiner*—Saleh Najjar
(74) *Attorney, Agent, or Firm*—Blakely, Sokoloff, Taylor & Zafman LLP

(57) ABSTRACT

The present invention provides for executing store instructions with a processor. The present invention executes each of the store instructions by producing the data that is to be stored and by calculating the destination address to which the data is to be stored. In the present invention, the store instructions are executed to produce the destination address of the store instruction earlier than the prior art.

63 Claims, 11 Drawing Sheets

METHOD AND APPARATUS FOR PERFORMING A STORE OPERATION

This is a continuation of application Ser. No. 08/483,285, filed Jun. 7, 1995, now abandoned, which is a continuation of application Ser. No. 08/177,250, filed Jan. 4, 1994 abandoned.

FIELD OF THE INVENTION

The present invention relates to the field of computer systems; more particularly, the present invention relates to performing store instructions.

BACKGROUND OF THE INVENTION

A computer system may be divided into three basic blocks: a central processing unit (CPU), memory, and input/output (I/O) units. These blocks are coupled to each other by a bus. An input device, such as a keyboard, mouse, disk drive, analog-to-digital converter, etc., is used to input instructions and data to the computer system via an I/O unit. These instructions and data can be stored in memory. The CPU retrieves the data stored in the memory and processes the data as directed by a set of instructions. The results can be stored back into memory or outputted via an I/O unit to an output device such as a printer, cathode-ray-tube (CRT) display, digital-to-analog converter, etc.

Data is stored back into memory as a result of the computer system performing a store operation. In the prior art, a store operation included an address calculation and a data calculation. The address calculation generated the address in memory at which the data is going to be stored. The data calculation produces the data that is going to be stored at the address generated in the address calculation portion of the store operation. These two calculations are performed by different hardware in the computer system and require different resources. In the prior art, the store operation is performed in response to one instruction, or one part of an instruction, wherein the data calculation is performed first and, once complete, the address calculation occurs as the operation goes to memory for execution.

One problem with current store operation is that they can stall the execution engine of the CPU during their execution. Many of today's CPUs are pipelined processors in which multiple instructions are being executed concurrently, all at different stages of execution. Often, load instructions follow store instructions in the execution pipeline. When executed, these load instructions cause data at an address specified in the instruction to be loaded into the CPU. If a load instruction is to load data from an address to which a store instruction is going to store data, then the execution of the load instruction must be stalled, thereby stalling the execution engine, until the store instruction has finished execution. Only in this way will the subsequent load instruction be guaranteed of loading the most current data. If the subsequent load instruction is not to the same address as the preceding store instruction, then its execution does not have to be stalled. Therefore, the determination of whether a particular load instruction must be stalled is based on an address comparison between the address of the store operation and the address of any subsequent load operations. However, in the prior art, the address calculation for store operations doesn't occur until the data has been calculated and the operation is going to memory. Thus, it is advantageous to compute the address of store operations as quickly as possible so the determination of whether to stall a particular load instructions can be made.

The present invention provides for performing store operations so that the address calculation may be performed sooner than that of the prior art. In this manner, any required stalling of subsequent load operations may be identified sooner than in the prior art.

SUMMARY OF THE INVENTION

A method and apparatus for executing store instructions is a computer system is described. The present invention includes a unit for separating the store operation into two operations. One of the operations includes an address calculation to determine the destination address in memory to which the data designated by the store instruction is to be stored. The other operation includes a data calculation to produce the data that is to be stored at the destination address. Both operations are executed by an execution unit independently of each other. Once both operations have been executed, then the destination address that is calculated and the data produced are recombined into a single operation that is dispatched by a memory control unit to memory.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE PRESENT INVENTION

A method and apparatus for performing store operations in a computer system is described. In the following detailed description of the present invention numerous specific details are set forth, such as specific buffer names, identification numbers, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid unnecessarily obscuring the present invention.

Overview of the Present Invention

The present invention provides a method and apparatus for performing a store operation in a computer system. The store operation is received by a processor in the computer system. The processor upon receiving the store operation produces two micro-operations, referred to as the store data (STD) and the store address (STA) operations. These micro-operations correspond to the data calculation and address calculation sub-operations of the store operation respectively. The processor then executes the STD and STA operations separately. Upon completion of the execution of the STD and STA operations, their results are combined and ready for dispatch to a cache memory or main memory.

The present invention uses a managing buffer that oversees the execution of the store data (STD) and store address (STA) operations. The managing buffer of the present invention indicates when the data is available and the address has been generated to complete the store operation to the memory device (e.g., cache, main memory). Once the managing buffer has determined that the data is available and that the address has been calculated, the managing buffer causes the data and the address to be sent to memory for completion.

By generating the address independently from the data for the store operations, the present invention is able to determine which of the subsequently issued load operations may have an address conflict or other dependency that would require the execution of a load operation to be stopped until the conflict is resolved. Moreover, by determining the address early, these load operations without conflicts or dependencies may continue without being halted, such that the memory subsystem of the present invention is non-blocking.

Overview of the Computer System of the Present Invention

Figure 1:
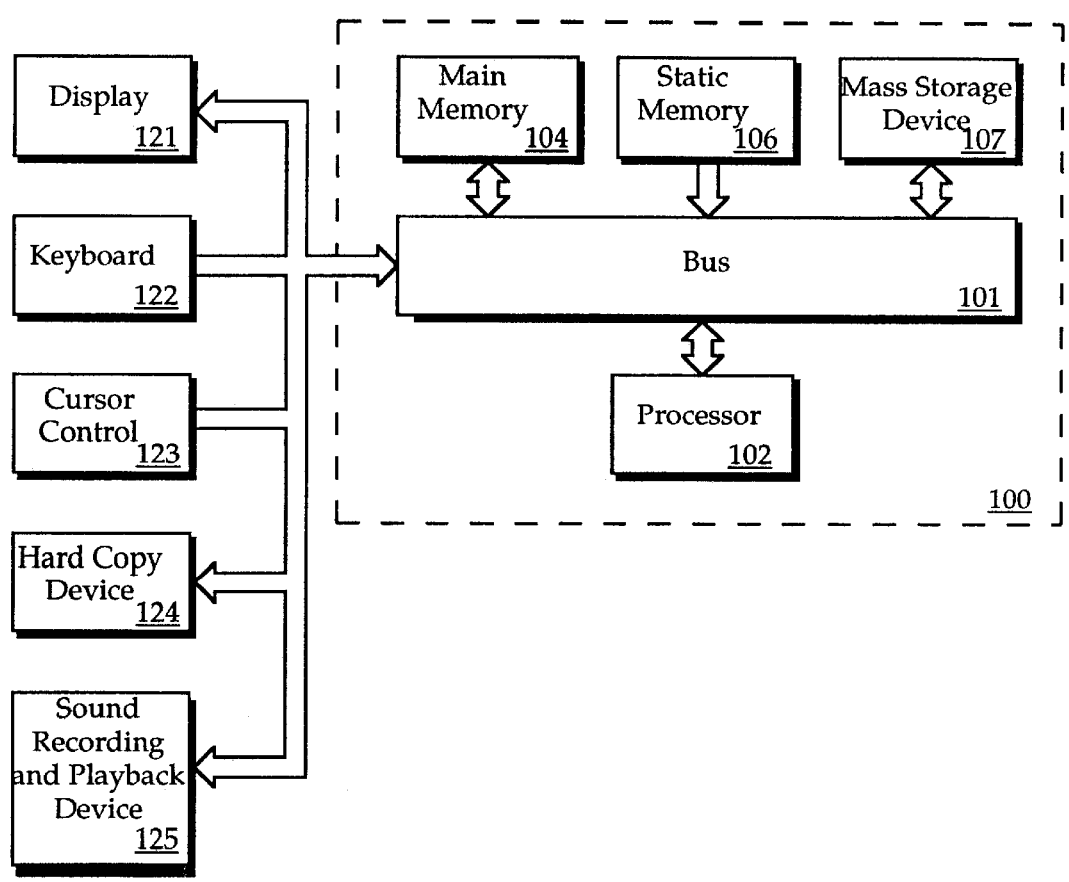
FIG. 1 is a block diagram of the computer system of the present invention.

Referring to FIG. 1, the computer system upon which a preferred embodiment of the present invention is implemented is shown as 100. Computer system 100 comprises a bus or other communication means 101 for communicating information, and a processing means 102 coupled with bus 101 for processing information. Processor 102 includes, but is not limited to microprocessors such as an Intel® Architecture Microprocessor, manufactured by Intel Corporation of Santa Clara, Calif., the corporate assignee of the present invention, PowerPC™, Alpha™, etc. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions.

Computer system 100 may further be coupled to a display device 121, such as a cathode ray tube (CRT) or liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. Furthermore, a sound recording and playback device, such as a speaker and microphone may optionally be coupled to bus 101 for interfacing with computer system 100. Note that any or all of the components of system 100 and associated hardware may be used in a preferred embodiment, however, it can be appreciated that any type of configuration of the system may be used for various purposes as the user requires.

Figure 2:
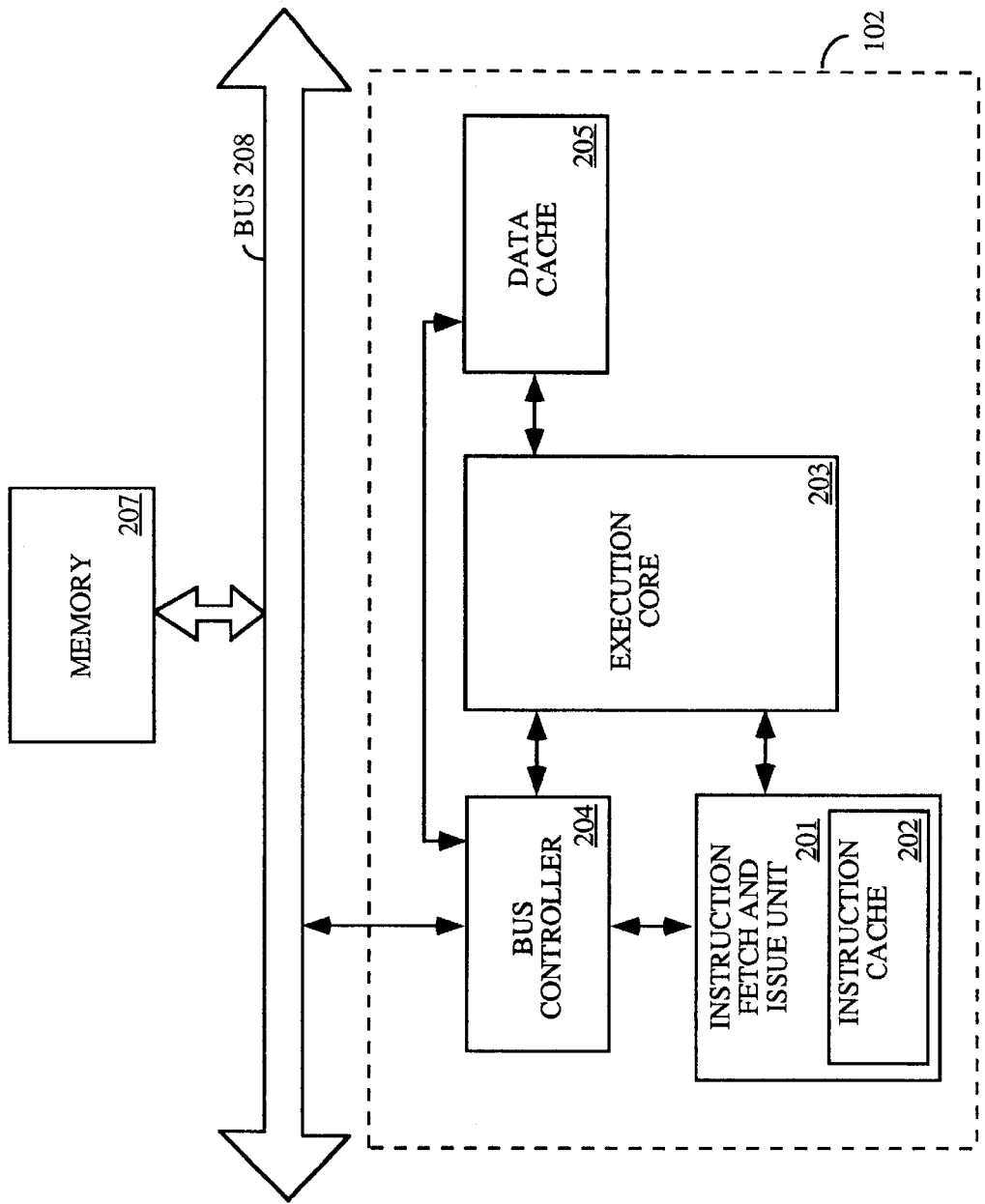
FIG. 2 is a block diagram of the memory subsystem of the present invention.

FIG. 2 is a block diagram of the memory subsystem of the computer system of the present invention. Referring to FIG. 2, the memory subsystem comprises an instruction fetch and issue unit 201 with an integrated instruction cache 202, an execution core 203, a bus controller 204, a data cache memory 205, a memory unit 207, and a bus 208.

The memory unit 207 is coupled to the system bus. The bus controller 204 is coupled to the bus 208. The bus controller 204 is also coupled to the data cache memory 205 and the instruction fetch and issue unit 201. The instruction fetch and issue unit 201 is also coupled to the execution core 203. The execution core 203 is also coupled to the data cache memory 205. In the present invention, the instruction fetch and issue unit 201, the execution core 203, the bus controller 204, and the data cache memory 205 together comprise the processor 102 (FIG. 1). In the present invention, elements 201–205 cooperate to fetch, issue, execute and save the execution results of instructions in a pipelined manner.

The instruction fetch and issue unit 201 fetches instructions from an external memory, such as memory unit 207, through the bus controller 204 via bus 208, or any other external bus. The fetched instructions are stored in instruction cache 202. The bus controller 204 manages transfers of data between external components and the processor 102. In addition, it manages cache coherency transfers. The instruction fetch and issue unit 201 issues these instructions in order to the execution core 203. The execution core 203 performs arithmetic and logic operations, such functions as add, subtract, logical AND, and integer multiply, as well as memory operations. Some instructions are fetch and issued speculatively.

The execution core 203 includes an execution unit that holds and executes the integer and floating point instructions when their operand dependencies on execution results of preceding instructions are resolved, including those integer and floating point instructions that are speculatively fetched and issued. Similarly, the execution core 203 also includes a memory execution unit that holds, executes and dispatches load and store instructions to the data cache memory 205 (as well as external memory) as soon as their operand dependencies on execution results of preceding instructions are resolved, including those load and store instructions that are speculatively fetched and issued.

The data cache memory 206 respond to the load instructions immediately, forwarding data if necessary, whereas the store instructions are buffered. In other words, the instructions are not necessarily executed/forward in the order they were issued, and some instructions are speculatively executed/forwarded. However, the execution results of the integer, floating point and load instructions are buffered, and then committed to processor state in program order. The buffer and store instructions are committed to processor state in program order and then executed in the "background", at the convenience of the memory system. Speculative integer, floating point and load execution results and buffer stores of mis-predicted branches are purged. Note that the speculative nature of fetched, issued and executed instructions is attributed to the uncertainty of whether a particular instruction or set of instructions is to be executed due to an unaffirmed branch prediction.

Instruction fetch and issue unit 201 is intended to represent a broad category of instruction fetching and issuing elements found in many computer systems. Their constitutions and functions are well-known and will be described only as necessary with reference to later figures.

The bus controller 204, the bus 208, and the memory 207 are also intended to represent a broad category of these elements found in most computer systems. Their functions and constitutions are well-known and will not be described further. The execution core 203, incorporating with the teachings of the present invention, and the data cache memory 205 will be described further in detail below with additional references to the remaining figures.

Figure 3:
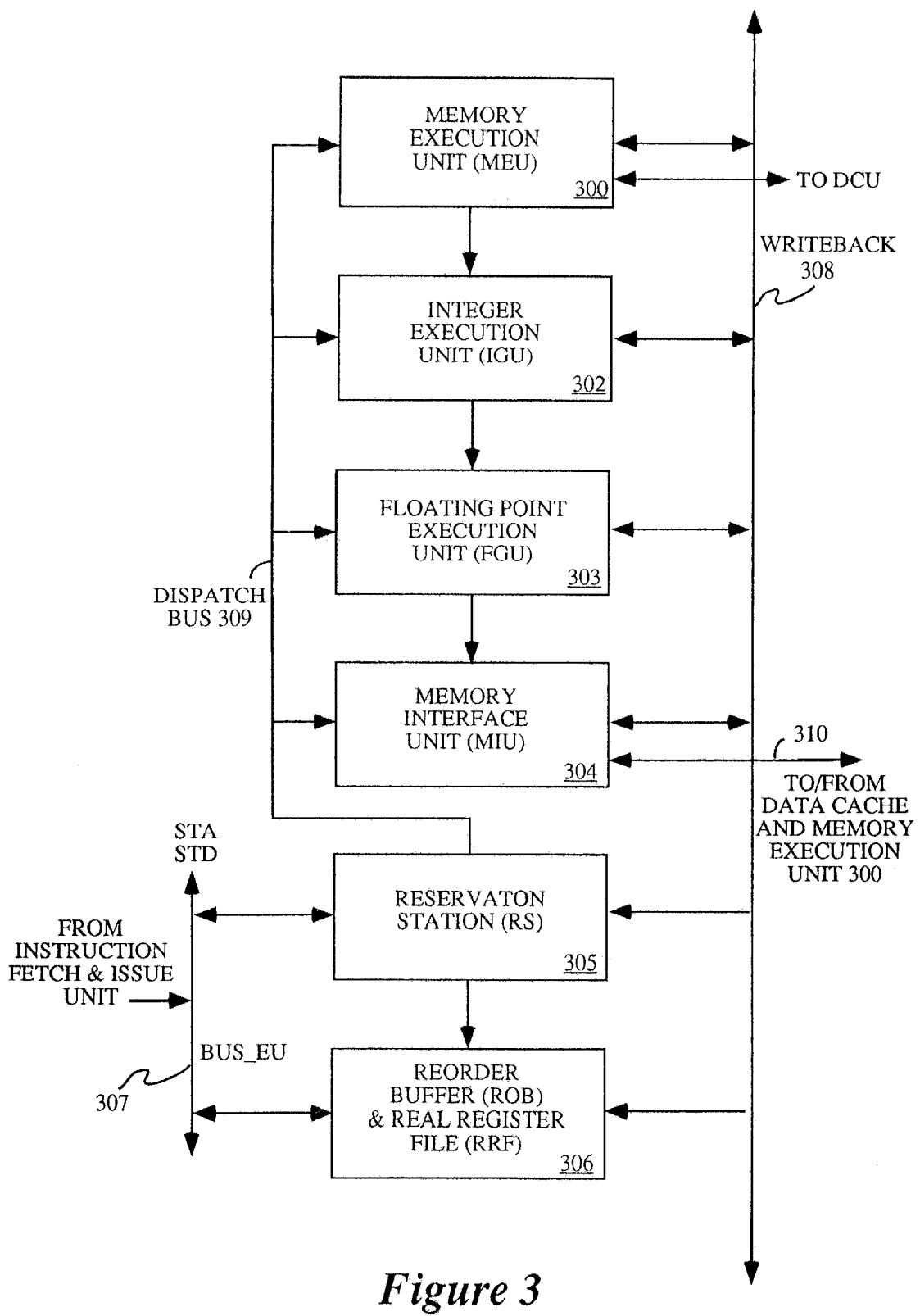
FIG. 3 is a block diagram of one embodiment of the execution core of the present invention.

FIG. 3 is a block diagram of one embodiment of the execution core of the present invention. Referring to FIG. 3, execution core 203 comprises a reservation station (RS) 305, a memory execution unit MEU 300, an integer execution unit (IEU) 302, a floating point execution unit (FEU) 303, a memory interface unit (MIU) 304, a reorder buffer (ROB) and real register file (RRF) 306. Additionally, execution core 203 includes an internal bus (Bus_EU) 307 and a writeback bus 308. MEU 300, AGU 301, IEU 302, FEU 303 and MIU 304 are all coupled to reservation station 305 via a dispatch bus 309. They are also coupled to writeback bus 308. MIU 304 is also coupled to the data cache memory and MEU 300 via bus 310. RS 305 is coupled to the writeback bus 308 and the Bus_EU 307. RS 305 is also coupled to ROB and RRF 306. ROB and RRF 306 is also coupled to the Bus_EU 307 and the writeback bus 308. Together, elements 300–310 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 203 may include multiple IEUs, such as two, and multiple FEUs, such as two.

Reservation station 305 receives and stores the issued instructions resolving their operands with data from the IEU 302, the FEU 303, the data cache memory, the ROB and RRF 306 and holds them until their operands are all resolved. The RS 305 then dispatches the issued instructions to the AGU 301, the IEU 302, the FEU 303 and the MIU 304 and the MEU 300 as appropriate.

In particular, the load instruction is dispatched as a single operation, whereas the store instruction is dispatched as store address (STA) and stored data (STD) operations to the MEU 300 and MIU 304. Similar to instruction fetching, there is no requirement that the load sources or the store destinations be aligned to memory locations. In other words, the load sources of load instructions and store destinations of store instructions may span two cache lines (or two pages).

The MEU 300, the IEU 302, FEU 303, and the MIU 304 in turn perform their operations accordingly. The execution results of the integer, floating point and load instructions are held in the ROB 306, and then committed by RRF 306 in the order these instructions were issued. Speculative execution results of the mispredicted branches are not committed, but instead are held in the ROB 306 and purged upon their detections.

Figure 5:
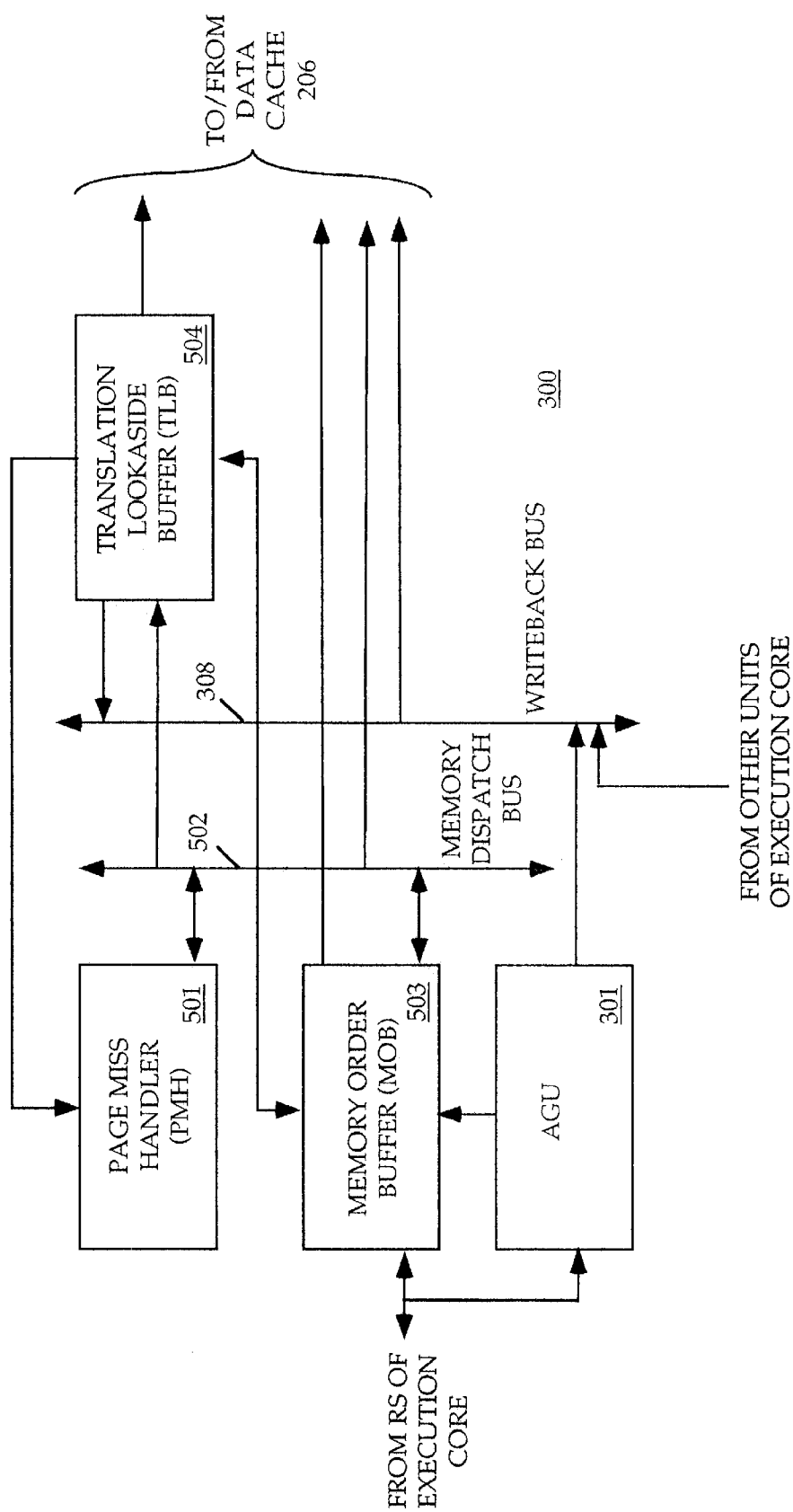
FIG. 5 is a block diagram of the relevant portions of the memory execution unit of the present invention.

FIG. 5 depicts a block diagram of the relevant portions of one embodiment of the memory execution unit (MEU) of the present invention. Referring to FIG. 5, the MEU 205 includes AGU 505, page miss handler 501, memory order buffer (MOB) 503, and translation lookaside buffer (TLB) 504, as well as memory dispatch 502 and the writeback bus 308. PMH 501 is coupled to the memory dispatch bus 502, writeback bus 308, and TLB 504. MOB 503 is coupled to the reservation station, memory dispatch bus 502, writeback bus 308, the data cache memory and TLB 504. TLB 504 is also coupled to memory dispatch bus 502, writeback bus 308 and the data cache memory. Memory dispatch bus 502 and writeback bus 308 are also coupled to the data cache memory. AGU 505 is coupled to MOB 503, the writeback bus 308, and the dispatch bus 309.

The AGU 505, MOB 503, PMH 501, and TLB 504 control all load accesses to the data cache memory and, in turn, the memory of the computer system. The AGU 505, MOB 503, PMH 501, and TLB 504 also execute the STA portion of the store. Specifically, MOB 503 buffers the results of the STA execution for the eventual store dispatch to the data cache memory.

Figure 4:
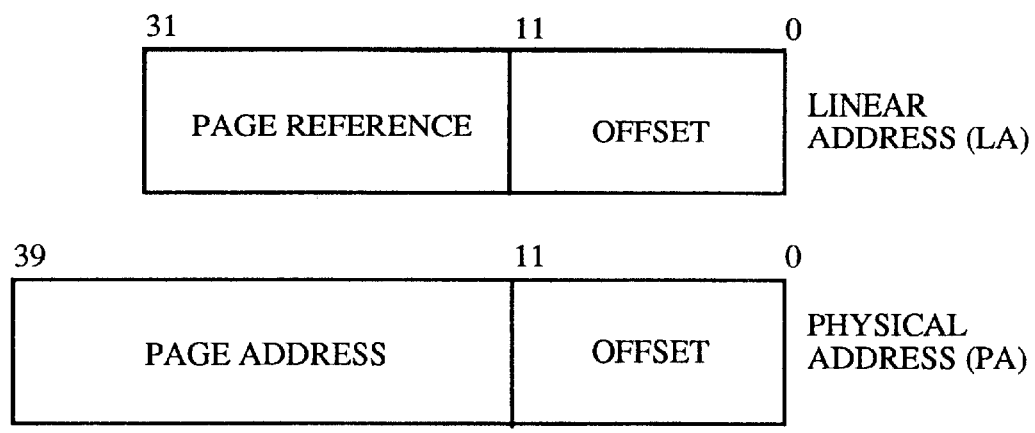
FIG. 4 illustrates an example of one embodiment of the addressing scheme of the present invention.

The AGU 505 generates the appropriate linear address for the memory operations. The AGU 505 computes the linear address using a base address, a displacement value, a scale value, an index value and a segment value. In one embodiment, the linear address is 32-bits long with a 20 higher order bits identifying a memory page and the 12 low order bits identifying the off-set within the memory page. An example of such an addressing scheme is shown in FIG. 4. In one embodiment, the present invention may include multiple AGUs, such as two, three, etc.

TLB 504 translates the 32-bit linear address into a 36-bit physical address with 24 higher order bits indicating the memory page, as shown in FIG. 4, and forwards misses to PMH 501. In response, PMH 501 performs page walking and other well-known page miss handling functions. The MOB 503, incorporated with the teachings of the present invention, controls dispatching, buffers all store and load operations, tracks their progress as they move through execution, and then retires/commits them to permanent architectural state as appropriate. MOB 503 then causes the retired/committed stores to be executed in due course "background" at the convenience of the memory system.

Additionally, MOB 503 responds to load operations by forwarding buffered data as necessary. When an operation is dispatched and cannot complete due to some address or resource conflict, MOB 503 blocks the operation and stores the dependency information. MOB 503 redispatches block operations when the blocking source is removed. Some memory operations cannot execute speculatively, MOB 503 controls the necessary monitoring and dispatched these non-speculative operations at the correct time. For instance, MOB 503 snoops the source addresses of instructions fetched and generates a single stall signal for the bus controller to stall an instruction fetch whenever the source address instruction being fetched substantially matches any of the addresses of the store destinations of the buffered stored instructions.

The TLB 504 and the PMH 501 are intended to represent a broad category of these elements found in most computer systems. MOB 503 will be described in further detail below with additional references to the remaining figures.

Figure 6:
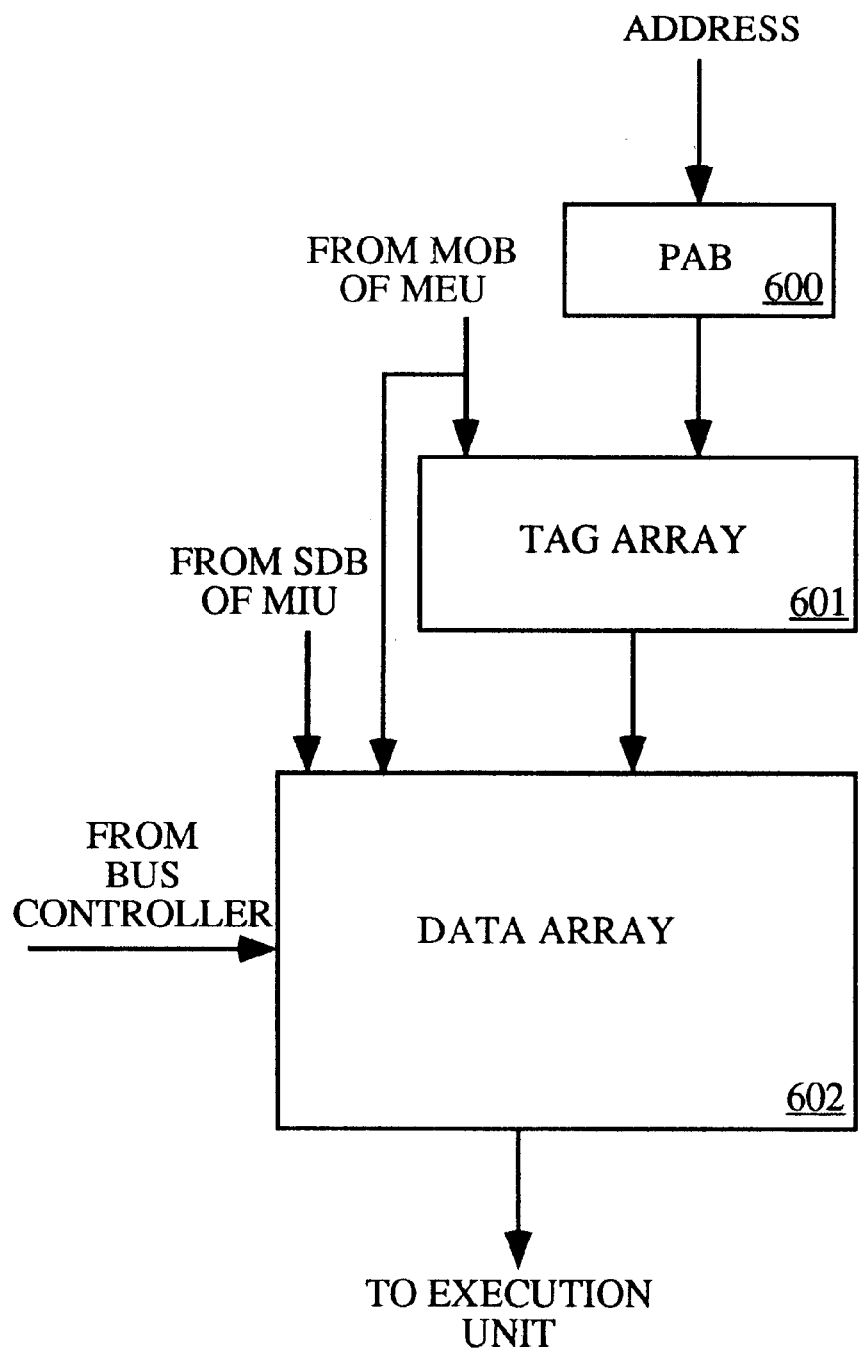
FIG. 6 is a block diagram of the relevant portions of the data cache of the present invention.

FIG. 6 is a block diagram of one embodiment of the data cache memory of the present invention. Referring to FIG. 6, the data cache memory 206 comprises a physical address buffer (PAB) 600, data tag array 601 and a data array 602. PAB 600 is coupled to receive an address input from the TLB of the MEU. Tag array 601 is coupled to receive an input from PAB 600 and from the store address buffer (SAB)

of the MOB (described later). Data array 602 is coupled to receive an input from tag array 601, the store data buffer (SDB) of the MIU, the MOB of the MEU and from the bus controller. In response, data array 602 produces an output to the execution core.

The PAB 600 receives and saves the 28 high order bits of the translated physical addresses from the TLB of the MEU for the store operations, and in cooperation with the MOB of the MEU and MIU, commits them to processor state and executes them as appropriate. Data tag array 601 stores the physical address tags of the data currently being cached data array 602 and tag matches the accessing physical addresses against the stored physical address tags. Data array 602 receives and stores the data currently being cached and responds to data loads. In one embodiment, data tag array 601 and data array 602 have sufficient capacity for storing 128 sets of 2-way set associative 32-byte cache lines of data and their corresponding address tags. PAB 600, in its cooperation with the MOB of the MEU, will be discussed in further detail below. TAG array 601 and data array 602 are intended to represent a broad category of these elements found in most computer systems, whose functions and constitutions are well-known and will not be further described.

Figure 7:
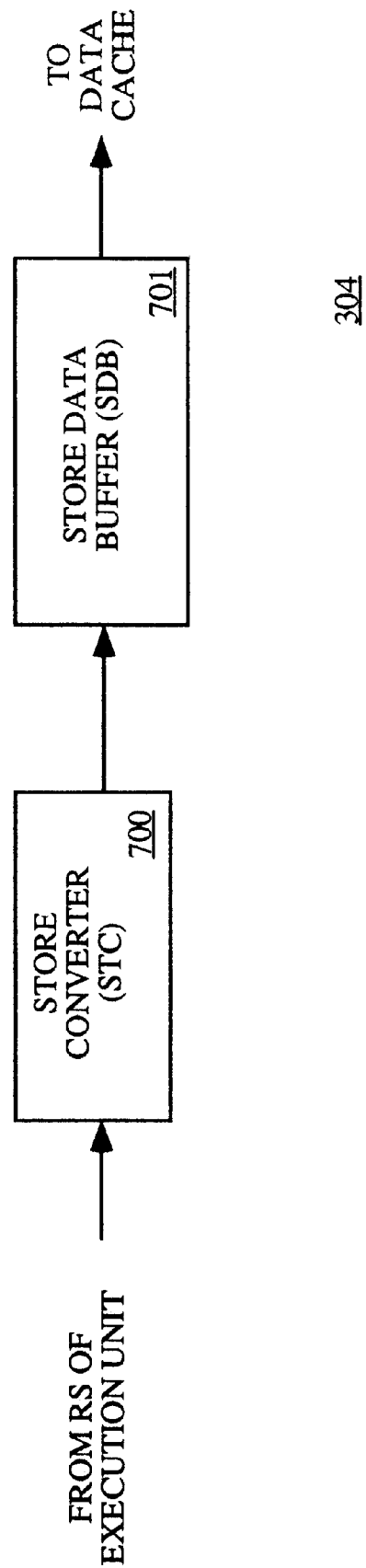
FIG. 7 is a block diagram of the relevant portions of memory interface unit of the present invention.

FIG. 7 is a block diagram of one embodiment of the relevant portions of the MIU of the execution core of the present invention. Referring to FIG. 7, the MIU 304 comprises a store converter (STC) 700 and a store data buffer (SDB) 701, coupled to each other, such that store converter 700 receives data from the reservation station of the execution core and sends data to SDB 701. SDB 701 then buffers the data and then sends the data onto the data cache memory.

The STC 700 converts the floating point data of the STD operations. The SDB 701 receives and stores the STD operations and in cooperation with the store address buffer (SAB) of the MEU, and the PAB of the data cache, commits the STD operations as appropriate, and causes them to be dispatched (with their corresponding STA operations) to memory. In one embodiment, the SDB 701 includes 12 entries, each for storing a single STD operation. In one embodiment, each entry is capable of storing 64 bits of data. Each entry in the SDB corresponds to an entry in the SAB and the PAB. That is, there is a one-to-one correspondence between the entries. The STA and STD operations are assigned entries when issued. The assignment is in the form of an ID, referred to as the store buffer ID (SBID). The functions and constitutions of the STC 700 are well-known and will not be further described. SDB 701 and its cooperation with the SAB and PAB, will be described in further detail below.

Figure 8:
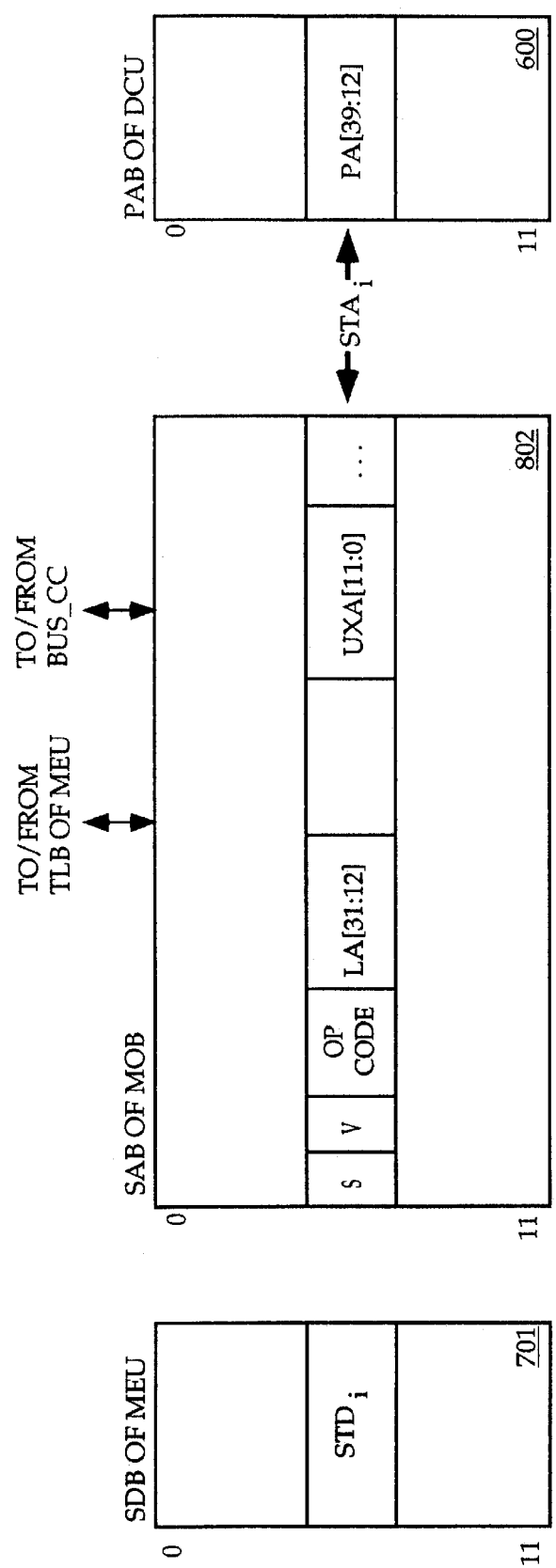
FIG. 8 is a block diagram depicting the interaction between the store address buffer the store data buffer and the physical address buffer.

FIG. 8 is a block diagram of one embodiment of the PAB, the SDB and the SAB. Referring to FIG. 8, SAB 802 is coupled to the TLB of the MEU and Bus_CC. The PAB 600, the SDB 701 and SAB 802 all include an equal number of buffer slots. In one embodiment, up to a maximum of 12 buffer slots are included. The STD and STA operations of the store instructions are stored in corresponding buffer slots of the PAB 600, SDB 701 and SAB 802. More specifically, the 28 high order bits of the physical address (PA [39:12]) are stored in a buffer slot in the PAB 600. The STD operation is stored in a corresponding buffer slot in the SDB 701. The STA operation, including the valid bit, the OP code, the 20 high order bits of the linear address (LA[31:12]), and the 12 page offset designating bits of the address (UXA[11:0]), is stored in a corresponding buffer slot in the SAB 802. The STD and STA operations of most store operations are promoted to a retired and committed processor state, i.e.

ready for retirement or commitment, in due course, when their respective preceding instructions have been retired/committed to processor state. The committed STD and STA operations are then dispatched in the "background" in due course when the data cache memory is available, after which time they are purged from the SDB 701, the SAB 802 and the PAB 600. The STD and STA operations of some of the store instructions, such as those storing data to memory locations mapped to I/O devices are retired/committed, and purged from the SDB 701, the SAB 802 and the PAB 600 concurrent with their executions. In one embodiment, the linear addresses are driven from the SAB 802 to the TLB again, and the newly generated PA is directly provided to the tag array of the data cache memory, bypassing the PAB of the data cache memory. Additionally, if a store instruction involves storing data to memory locations spanning two cache lines, the MEU signals the data cache memory, and the STD and STA operations are driven to the data cache memory twice, with the data size and the physical address being adjusted accordingly the second time.

Performing Store Operations in the Present Invention

Figure 9:
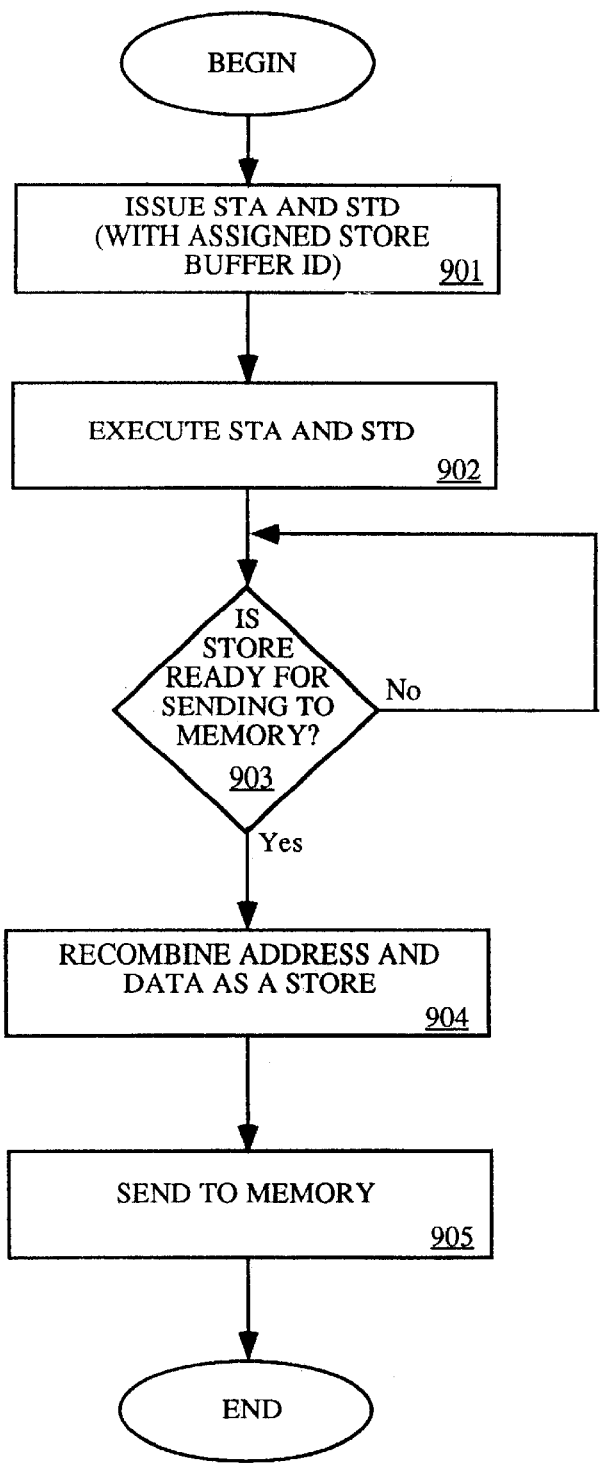
FIG. 9 is a flow chart depicting the process of the present invention for performing store operations.

The process for performing store operations in the present invention is shown in FIG. 9. In the present invention, each store operation is received and executed by a processor. The store operation is received as a store instruction. Referring to FIG. 9, in response to receiving a store instruction, a store data (STD) and store address (STA) instructions are issued (processing block 901). The STD and STA instructions are then executed independently and possibly in parallel, depending on the availability of resources (processing block 902). A determination is then made as to whether the store is ready to send to memory (processing block 903). Once it is determined that the store is ready to be sent to memory (e.g., ready to be committed to processor state), the address and data results from the execution of the STA and STD instructions respectively, are recombined as a single store operation (processing block 904). Once the store has been recombined, the store is sent to memory for completion (processing block 905).

In the present invention, the processor receives a stream of instructions and initially generates a sequence of microinstructions, including the STA and STD micro-instructions. The stream of instructions is usually received by the processor in response to an instruction fetch initiated by the processor. The micro-instructions are generated by a decoder in the instruction fetch and issue unit. The microinstructions are issued in order as the processor reads the instruction. The STA and STD micro-instructions are then issued to the execution core of the processor for execution.

Because of the multiple buffer entries for the SDB, SAB and PAB, if multiple AGUs and multiple execution units are within the execution core, then the execution core of the present invention may execute multiple STA/STD pairs at the same time in parallel. Furthermore, STA/STD pairs may execute out-of-order where there are no conflicts or dependencies between the store operations.

Figure 10:
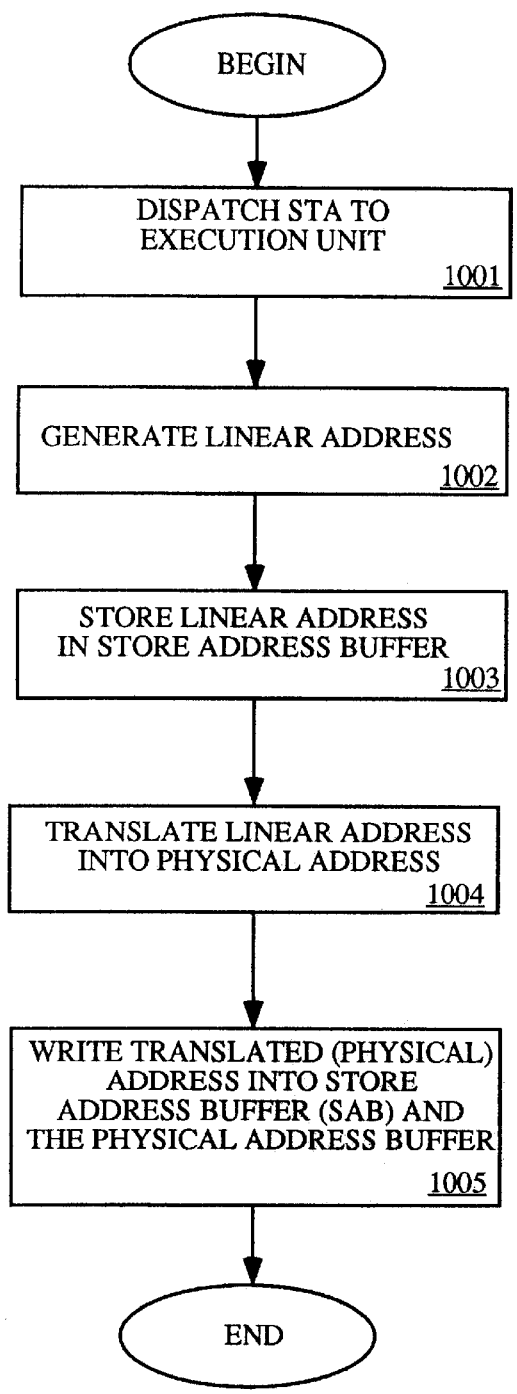
FIG. 10 is a flow chart depicting the execution process of a store address (STA) micro-operation.
Figure 11:
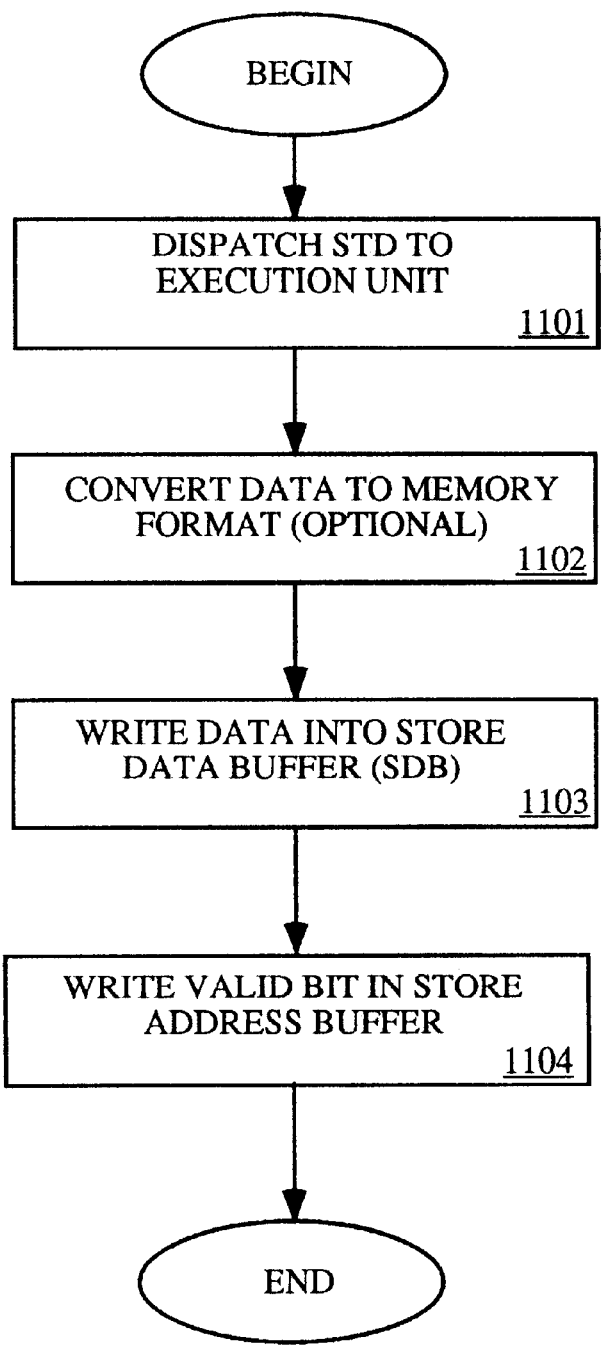
FIG. 11 is a flow chart depicting the execution process of a store data (STD) micro-operation.

FIGS. 10 and 11 are flow charts depicting the execution of the STA and STD microinstructions respectively. If the execution of instructions is performed out-of-order, such that subsequently issued microinstructions are executed before previously issued microinstructions, then the STA and STD instructions are scheduled for execution by the reservation station. That is, the reservation station receives the STA and STD microinstructions determines when these microinstructions, and any other received microinstructions, may be sent to be executed. The determination of when a particular microinstruction may be sent for execution is based on the availability of resources (e.g., AGUs, ALUs, etc.), as well as any true data dependencies that exist between the microinstructions.

Referring to FIG. 10, the execution of a STA microinstruction begins when it is dispatched to an execution unit (processing block 1001). The STA microinstruction is dispatched by the reservation station to the AGU. Next, the linear address is generated by the AGU (processing block 1002). The STA microinstruction includes the information necessary for the AGU to generate the linear address. In one embodiment, the AGU receives data in the form of a base address value, index value, displacement value, a scale value and a segment value which are added together to create the linear address. The AGU calculates the linear address in a manner well-known in the art.

Once the linear address is calculated, it is stored in the store address buffer (SAB) (processing block 1003). A valid bit in the SAB may also be set, thereby indicating that the address is valid. The linear address is also sent to the TLB where the linear address is translated into a physical address (processing block 1004). The translation of the linear address into the physical address is accomplished in a manner well-known in the art. The translated (physical) address is stored in the SAB and the PAB (processing block 1005), thereby completing its execution.

In one embodiment, the execution of the STA microinstruction is performed in a pipelined manner. In the currently preferred embodiment, the dispatching of the STA microinstruction occurs in a first cycle, followed by the linear address generation in the second, or next, cycle. In the second half of the second cycle, the linear address is stored in the SAB. In the third cycle, the linear address is translated by the TLB. In the second half of the fourth cycle, the translated (physical) address is written into the SAB and the PAB.

Referring back to FIG. 11, the STD execution begins with the dispatch of the STD microinstruction to the execution unit (processing block 1101). Once again, the STD microinstruction is dispatched by the reservation station. It should be noted that the data to be stored as a result of the execution of the STD microinstruction is data that is created or exists to some extent within the operating environment of the processor. Thus, the STD microinstruction is dispatched when that data is ready to be stored. In other words, the STD microinstruction is dispatched when the data to be stored has been created or is already present in the processor. The same relationship exists between the STA microinstruction and the address of the store.

Once the STD microinstruction has been dispatched, the data may be converted into a memory format (processing block 1102). In the present invention, this conversion occurs when the data is in a floating point format. In this case, the data is converted into a floating point format with less precision that may be stored in memory. If the data is in integer format, then the data does not have to undergo any conversion. In one embodiment, the data is converted by the store converter.

After the data is converted, (if necessary), then the data is written into the store data buffer (SDB) (processing block 1103) and the valid bit in the SAB is set (processing block 1104). Therefore, if the data is integer data, it goes directly into the SDB.

In one embodiment, the STD microinstruction is executed in a pipelined manner. In the currently preferred embodiment, the STD microinstruction is dispatched in a first clock cycle. In the first half of the next cycle, any conversion of the data by the store connector occurs. In the second half of the second cycle, the data is written into the SDB and the valid bit in the SAB is written, thereby indicating that the data in the SDB is valid.

The MOB monitors the execution of the STD and STA microinstructions and determines when their respective data and address calculations have completed, so that the store operation may be completed or dispatched to memory. In the present invention, the MOB determines that the store operation is ready for completion by examining whether the address and data stored in the SAB and the SDB respectively are valid and whether the ROB has committed these operations to processor state. In one embodiment, the MOB determines the validity of the address and data stored in the SAB and SDB by examining the valid bits in the SAB. If the valid bit indicating that the address is valid and the valid bit indicating the SDB contains valid data corresponding to the address, then the MOB determines that the address and data information stored in the buffers is valid. The ROB indicates that the operations have been committed through the use of one or more signals sent to the MOB.

When the store is ready for dispatch to memory, the address and data are read out of their respective buffers, and the MOB dispatches them to the data cache memory. However, the MOB does not have to send the store to memory immediately upon determining that the address and data have been committed. In one embodiment, the store is sent by the MOB at the convenience of the memory system.

In one embodiment, both the SAB, PAB and the SDB have multiple entries for storing the address and data for multiple STA and STD operations, all of which might be at some stage of execution in the processor. There is a one-to-one correspondence between the entries in the SAB and the entries in the SDB. In order to maintain a correlation between a particular STA microinstruction and its corresponding STD microinstruction, each set of STA and STD microinstructions is assigned an identification (ID), referred to as a store buffer ID (SBID). Each SBID corresponds to one entry in both the SAB and the SDB. Since there are twelve locations in each of the SAB and the SDB, each entry corresponds to one of twelve separate SBIDs.

A SBID is assigned to each set of STA and STD microinstructions. This assignment occurs during the decoding of the store instruction, as part of the resource assignment. The STA and STD operations are tagged with the SBID. In the present invention, the instruction fetch and issue unit allocates the next available SBID. Since only twelve buffer locations exist, the instruction fetch and issue unit is able to enable a "wrap-around" effect by reallocating SBID from the top of the buffer (entry no. 1) after the SBID for the bottom (entry no. 12) has already been allocated.

Thus, once a SBID has been appended to the STA and STD microinstructions, the microinstructions are executed in two separate operations. A combining buffer (e.g., the SAB) monitors the execution of the STA and STD microinstructions and when the address and data are available, the store operation is dispatched to the data cache memory by the MOB indicating the specific entry in the SAB and SDB using the SBID. In one embodiment, this includes having the address output from the PAB.

The present invention identifies for all operations that depend on a particular store operation. In one embodiment, all loads that are issued subsequent to a particular store operation are tagged with the SBID of the store operation. By tagging all of the loads, as well as the store, the MOB is able to maintain any dependencies between store operations and load operations. In other words, the MOB knows which store operations were issued before specific load instructions by examining the tags assigned to each of the operations.

When a store address is written into the SAB, the address is marked valid. In one embodiment, the address is marked valid by setting a valid bit associated with the entry of the address.

The SBID may also be used to detect for address collisions between store operations and subsequently load operations. In the present invention, by precalculating the address, some of the dependencies between load operations and store operations may be identified. In the present invention, the address of a store operation, through the STA microinstruction, may be calculated early so that a determination can be made as to whether subsequently issued load operations are to the same address. If they are, then they can be stalled until the store has completed execution. In this manner, the present invention ensures that a subsequent issued load operation loads the correct, or most recent, data.

In the present invention, the MOB determines if there is an address collision. If those two addresses collide, thereby indicating that there is an access to the same location, then the data is significant because the data can satisfy the load operation. If the addresses are different, the load operation is independent of the stores in the SAB, and does not need to be stalled. In the present invention, the MOB is able to cause the operation to be aborted using signal(s) and buffer the operations until the conflict no longer exists. At that time, the MOB causes the operations to be redispatched.

Therefore, this present invention computes the address early to try to manage that dependency, irrespective of the data that is involved. In the prior art, this determination requires several clocks, during which time the data is being calculated, before it is known whether there is a collision. The present invention reduces this delay and allows the resources executing the load operations to continue where there is no dependency. Because the present invention calculates the address early, a load operation seeking data from that address must wait, while those that do not want the data, may continue. In this way, the processor of the present invention operates as a non-blocking engine.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for performing a store operation has been described.

We claim:

1. A method for performing a store operation in a computer system comprising the steps of:
   creating a first operation and a second operation in response to the store operation, wherein the first operation includes an address calculation for the store operation and the second operation includes a data calculation for the store operation;
   executing the first operation and the second operation as individual instruction entities, wherein the time during which the first operation is executed is independent of the time during which the second operation is executed; and
   recombining the first operation and the second operation, wherein an address generated by executing the first operation and data produced by executing the second operation are combined for dispatch to memory as a single operation.

2. The method defined in claim 1 wherein the first operation and the second operation are recombined in a memory storage area.

3. The method defined in claim 2 wherein the memory storage area includes at least one buffer.

4. The method defined in claim 1 further comprising the steps of storing an address generated by the first operation in a first buffer and storing the data produced by the second operation in a second buffer prior to dispatching.

5. The method defined in claim 4 further comprising the step of providing an indication in the first buffer that the data produced by the second operation is stored in the second buffer.

6. The method defined in claim 1 wherein the step of creating includes the step of assigning a first identification (ID) to the first operation and a second ID to the second operation, wherein the first operation and the second operation are recombined using the first ID and the second ID.

7. The method defined in claim 6 wherein the first ID and the second ID are the same.

8. The method defined in claim 1 further comprising the steps of translating an address generated by the first operation and storing the translated address in a buffer.

9. The method defined in claim 8 wherein the buffer stores the physical address.

10. The method defined in claim 1 wherein the first operation and the second operation comprise a first microinstruction and a second microinstruction respectively.

11. The method defined in claim 1 wherein the first operation and the second operation comprise a first microinstruction and a second microinstruction respectively.

12. A method for performing a store operation in a computer system comprising the steps of:
    issuing a first operation and a second operation, wherein the first operation includes an address calculation for the store operation and the second operation includes a data calculation for the store operation;
    executing the first operation and the second operation as individual instruction entities, wherein the time during which the first operation is executed is independent of the time during which the second operation is executed;
    storing an address generated by the first operation in a first buffer;
    storing the data produced by the second operation in a second buffer;
    providing an indication when the data produced by the second operation has been stored in the second buffer and the address has been stored in the first buffer; and
    combining the address generated by executing the first operation and data produced by executing the second operation for dispatch to memory as a single operation in response to the indication.

13. The method defined in claim 12 wherein the step of issuing the store operation includes the step of assigning a first identification (ID) to the first operation and a second ID to the second operation, wherein the first operation and the second operation are combined using the first ID and the second ID.

14. The method defined in claim 13 wherein the first ID and the second ID are the same.

15. The method defined in claim 12 wherein the step of providing includes providing the indication in the first buffer when the data has been stored in the second buffer, such that the step of combining occurs when the indication is provided in the first buffer and the address has been generated.

16. The method defined in claim 15 wherein the step of providing an indication includes setting at least one bit in the first buffer.

17. A method for performing a store operation in a computer system comprising the steps of:
 issuing the store operation into a first instruction entity and a second instruction entity, wherein the first instruction entity includes an address calculation for the store operation and the second instruction entity includes a data calculation for the store operation, and further wherein the step of splitting the store operation includes the steps of
  assigning a first identification (ID) to the first instruction entity, and
  assigning a second ID to the second instruction entity;
 executing the first instruction entity;
 executing the second instruction entity, wherein the time during which the first instruction entity is executed is independent of the time during which the second instruction entity is executed;
 storing an address generated by the first instruction entity in a first buffer;
 storing the data produced by the second instruction entity in a second buffer;
 providing an indication when the data produced by the second instruction entity has been stored in the second buffer, wherein the indication is provided in the first buffer when the data has been stored in the second buffer; and
 combining the address generated by executing the first instruction entity and data produced by executing the second instruction entity for dispatch to memory as a single operation when the indication is provided in the first buffer and the address has been generated.

18. The method defined in claim 17 wherein the step of issuing the store operation includes the step of assigning a first identification (ID) to the first operation and a second ID to the second operation, wherein the first operation and the second operation are combined using the first ID and the second ID.

19. The method defined in claim 18 wherein the first ID and the second ID are the same.

20. The method defined in claim 17 wherein the step of providing an indication includes setting at least one bit in the first buffer.

21. The method defined in claim 17 wherein the address is stored in the first buffer according to the first ID and the data is stored in the second buffer according to the second ID.

22. The method defined in claim 21 wherein the second ID is the same as the first ID, such that the address is stored in the first buffer and the data is stored in the second buffer according to the first ID, and further wherein the step of combining includes accessing the first buffer and the second buffer at corresponding locations.

23. The method defined in claim 17 wherein the first operation and the second operation comprise a first microinstruction and a second microinstruction respectively.

24. A processor for use in a computer system, wherein the processor executes a plurality of instructions, the plurality of instructions including at least one store instruction, said processor comprising:
 a bus;
 an issue unit coupled to the bus, wherein the issue unit issues a first operation and a second operation in response to said at least one store instruction, wherein the first operation includes an address calculation for the store instruction and the second operation includes a data calculation for the store instruction;
 at least one execution unit coupled to the bus, wherein said at least one execution unit executes the first operation and the second operation as individual instruction entities such that the time during which the first operation is executed is independent of the time during which the second operation is executed; and
 a memory control unit coupled to the bus, wherein the memory control unit combines an address generated by executing the first operation and data produced by executing the second operation into a single operation, such that the first operation and the second operation are recombined for dispatch as the single operation to memory.

25. The processor defined in claim 24 wherein the memory control unit includes a memory storage area for storing the address and the data.

26. The processor defined in claim 25 wherein the memory storage area includes a first buffer for storing the address and a second buffer for storing the data.

27. The processor defined in claim 26 further comprising a storage space for indicating when the data has been stored in the second buffer, and further wherein the memory control unit dispatches the address and data when the address has been generated and the storage space indicates that the data has been stored in the second buffer.

28. The processor defined in claim 27 wherein the storage space is located in the first buffer.

29. The processor defined in claim 27 or 28 wherein the storage space comprises one bit location.

30. The processor defined in claim 24 wherein the issue unit assigns a first identification (ID) to the first operation and a second ID to the second operation for correlation of the first operation and the second operation by the memory control unit, such that the memory control unit recombines the first operation and the second operation using the first ID and the second ID.

31. The processor defined in claim 30 wherein the address is stored in the first buffer according to the first ID and the data is stored in the second buffer according to the second ID.

32. The processor defined in claim 31 wherein the second ID is the same as the first ID.

33. The processor defined in claim 32 wherein the address is stored in the first buffer and the data is stored in the second buffer according to the first ID, and further wherein the memory control unit accesses the first buffer and the second buffer at corresponding locations to dispatch the single operation to memory.

34. The processor defined in claim 24 wherein the first operation and the second operation comprise a first microinstruction and a second microinstruction respectively.

35. A processor for use in a computer system, wherein the processor executes a plurality of instructions, the plurality of instructions including at least one store instruction, said processor comprising:
 a bus;
 an issue unit coupled to the bus, wherein the issue unit issues a first operation and a second operation in response to said at least one store instruction, wherein the first operation includes an address calculation for the store instruction and the second operation includes a data calculation for the store instruction;
 at least one execution unit coupled to the bus, wherein said at least one execution unit executes the first operation and the second operation as individual instruction entities such that the time during which the first operation is executed is independent of the time during which the second operation is executed;

a first memory storage area coupled to the bus to store an address generated by executing the first operation;

a second memory storage area coupled to the bus to store data produced by executing the second operation;

indicator coupled to the second memory storage area to generate an indication when the data is stored in the second memory storage area;

a memory control unit coupled to the bus, wherein the memory control unit combines the address and the data into a single operation and dispatches the single operation to memory in response to the indication, such that the store operation is completed.

36. The processor defined in claim 35 wherein the issue unit assigns a first identification (ID) to the first operation and a second ID to the second operation for correlation of the first operation and the second operation by the memory control unit, such that the memory control unit recombines the first operation and the second operation using the first ID and the second ID.

37. The processor defined in claim 36 wherein the address is stored in the first memory storage area according to the first ID and the data is stored in the second memory storage area according to the second ID.

38. The processor defined in claim 37 wherein the second ID is the same as the first ID.

39. The processor defined in claim 38 wherein the address is stored in the first memory storage area and the data is stored in the second memory storage area according to the first ID, and further wherein the memory control unit accesses the first memory storage area and the second memory storage area at corresponding locations to dispatch the single operation to memory.

40. The processor defined in claim 35 wherein the first operation and the second operation comprise a first microinstruction and a second microinstruction respectively.

41. A processor for use in a computer system, wherein the processor executes a plurality of instructions, the plurality of instructions including at least one store instruction, said processor comprising:

bus means for communication information;

instruction issue means coupled to the bus for issuing a first operation and a second operation in response to said at least one store instruction, wherein the first operation includes an address calculation for the store operation and the second operation includes a data calculation for the store operation;

execution means coupled to the bus for executing the first operation and the second operation as individual instruction entities such that the time during which the first operation is executed is independent of the time during which the second operation is executed;

memory control means coupled to the bus for combining an address generated by executing the first operation and data produced by executing the second operation into a single operation, wherein the memory control means includes a first memory storage means for storing the address, a second memory storage means for storing the data, and an indication coupled to the second memory storage means and the first memory storage means for generating an indication when the data is stored in the second memory storage area and the address is stored in the first memory storage means, and wherein the memory control means dispatches the single operation to memory in response to the indication, such that the store operation is completed.

42. The processor defined in claim 41 wherein the first operation and the second operation comprise a first microinstruction and a second microinstruction respectively.

43. A computer system comprising:

a bus;

a main memory coupled to said bus for storing digital data;

an issue unit coupled to the bus, wherein the issue unit issues a first operation and a second operation in response to a one store instruction, wherein the first operation includes an address calculation for the store instruction and the second operation includes a data calculation for the store instruction;

at least one execution unit coupled to the bus, wherein said at least one execution unit executes the first operation and the second operation as individual instruction entities such that the time during which the first operation is executed is independent of the time during which the second operation is executed; and a memory control unit coupled to the bus, wherein the memory control unit combines an address generated by executing the first operation and data produced by executing the second operation into a single operation, such that the first operation and the second operation are recombined, and wherein the memory control unit dispatches the single operation to the main memory, such that the store operation is completed.

44. The computer system defined in claim 43 wherein the memory control unit includes a memory storage area for storing the address and the data.

45. The computer system defined in claim 44 wherein the memory storage area includes a first buffer for storing the address and a second buffer for storing the data.

46. The computer system defined in claim 45 further comprising a storage space for indicating when the data has been stored in the second buffer, and further wherein the memory control unit dispatches the address and data when the address has been generated and the storage space indicates that the data has been stored in the second buffer.

47. The computer system defined in claim 46 wherein the storage space is located in the first buffer.

48. The computer system defined in claim 46 or 47 wherein the storage space comprises one bit location.

49. The computer system defined in claim 43 wherein the first operation and the second operation comprise a first microinstruction and a second microinstruction respectively.

50. A method for performing a store operation in a computer system, said method comprising the steps of:

issuing a first operation and a second operation in response to the store operation, wherein the first operation includes an address calculation for the store operation and the second operation includes a data calculation for the store operation;

executing the first operation, where an address for the store operation is generated;

determining dependencies between at least one load operation and the store operation according to said address;

executing the second operation, wherein the time during which the first operation is executed is independent of the time during which the second operation is executed;

recombining the first operation and the second operation, wherein an address generated by executing the first operation and data produced by executing the second operation are combined for dispatch to memory as a single operation.

51. The method defined in claim 50 wherein said step of determining includes dispatching said at least one load operation to memory if there is no address dependency.

52. The method defined in claim 50 wherein the step of determining is performed independently of the second operation.

53. A method for performing a first store operation and a second store operation in a computer system, wherein the first store operation precedes the second store operation in program order, said method comprising the steps of:

issuing a first address calculation operation and a first data operation in response to the first store operation;

issuing a second address calculation operation and a second data operation in response to the second store operation;

executing the first address calculation operation, the first data operation, the second address calculation operation, and the second data operation as individual instruction entities, wherein the time during which the first address calculation operation is executed is independent of the time during which the first data operation is executed, and the time during which the second address calculation operation is executed is independent of the time during which the second data operation is executed;

recombining the first address calculation operation and the first data operation for dispatch to memory as a first single operation; and recombining the second address calculation operation and the second data operation for dispatch to memory as a second single operation.

54. The method defined in claim 53 wherein the step of executing includes executing the first store operation and the second store operation simultaneously.

55. The method defined in claim 53 wherein the step of recombining the second address calculation and the second data operation occurs prior to the step of recombining the first address calculation operation and the first data operation, such that the execution of the first store operation and the execution of the second store operation occur out-of-order.

56. The method defined in claim 55 wherein the step of executing includes executing the second address calculation operation prior to the execution of the first address calculation operation.

57. The method defined in claim 55 wherein the step of executing includes executing the second data calculation operation prior to the execution of the first data calculation operation.

58. The method defined in claim 53 wherein the first address calculation operation and the first data operation comprise a first address calculation microinstruction and a first data microinstruction respectively and the second address calculation operation and the second data operation comprise a second address calculation microinstruction and a second data microinstruction respectively.

59. A processor comprising:

a bus;

an issue unit coupled to the bus to issue operations in response to a plurality of instructions in a program sequence, wherein the issue unit issues two independently executable operations in response to a store instruction, wherein a first operation of said two operation comprises an address calculation for the store instruction and a second operation of said two operations comprises a data calculation for the store instruction;

an execution core coupled to the instruction issue unit to execute operations issues by the issue unit, wherein the execution core executes operations in an execution sequence different from the program sequence, and further wherein the execution core executes the first operation and the second operation as individual instruction entities, wherein the time during which the first operation is executed is independent of the time during which the second operation is executed, said execution core comprising a reservation station that receives and stores operations from the issue unit until operands are resolved, wherein the reservation station then dispatches the operations for execution; and a memory execution unit coupled to the reservation station, said memory execution unit executing the first operation and the second operation at different times and combining an address generated by the execution of the first operation and data produced by executing the second operation into a single operation for dispatch to memory after execution of the first operation and the second operation has completed.

60. The processor defined in claim 59 wherein the memory execution unit includes a store address buffer for storing addresses corresponding to address calculation operations issued by the issue unit and a store data buffer for storing data associated with data calculation operations issued by the issue unit.

61. The processor defined in claim 60 wherein the memory execution unit further includes an indication coupled to the store address buffer and store data buffer indicating when information stored therein is valid, wherein the memory execution unit dispatches the single operation to memory in response to the indication being valid, such that the store operation is completed.

62. The processor defined in claim 59 wherein the first operation and the second operation comprise a first microinstruction and a second microinstruction respectively.

63. The method defined in claim 61 wherein the first operation and the second operation comprise a first microinstruction and a second microinstruction respectively.

* * * * *